US009268676B2

(12) United States Patent
Shiratori (10) Patent No.: US 9,268,676 B2
(45) Date of Patent: Feb. 23, 2016

(54) DATA STORAGE MECHANISM USING STORAGE SYSTEM DETERMINED WRITE LOCATIONS

(71) Applicant: International Business Machines Corporation, Armonk, NY (US)

(72) Inventor: Toshiyuki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/733,997

(22) Filed: Jan. 4, 2013

(65) Prior Publication Data

US 2014/0195745 A1 Jul. 10, 2014

(51) Int. Cl.
*G06F 12/00* (2006.01)
*G06F 3/06* (2006.01)
*G11B 20/10* (2006.01)
*G11B 20/12* (2006.01)

(52) U.S. Cl.
CPC ............... *G06F 12/00* (2013.01); *G06F 3/064* (2013.01); *G06F 3/0611* (2013.01); *G06F 3/0682* (2013.01); *G11B 20/10* (2013.01); *G11B 20/1201* (2013.01)

(58) Field of Classification Search
CPC ...... G06F 3/0682; G06F 3/0611; G06F 3/064
USPC ......................................................... 711/154
See application file for complete search history.

(56) References Cited

U.S. PATENT DOCUMENTS 5,745,789 A 4/1998 Kakuta
7,350,021 B2 3/2008 Itagaki et al.
7,882,315 B2 * 2/2011 Tsai et al. .................... 711/162
8,433,880 B2 * 4/2013 Iyer et al. .................... 711/203
8,838,934 B2 * 9/2014 Iver et al. .................... 711/203

(Continued)

FOREIGN PATENT DOCUMENTS

JP 05-265661 10/1993
JP 2007-95231 4/2007

(Continued)

OTHER PUBLICATIONS

International Preliminary Report on Patentability dated Jul. 16, 2015 for International Application No. PCT/JP2013/006443, 5 pages.

(Continued)

*Primary Examiner* — Matthew Bradley
(74) *Attorney, Agent, or Firm* — Stephen J. Walder, Jr.; Randall J. Bluestone (57) ABSTRACT

Mechanisms are provided, in a storage system controller of a storage system, for writing data to a storage medium. The storage system controller receives a write request to write a block of data to the storage medium. The write request does not specify a location on the storage medium to which to write the block of data. The storage system controller determines a current position of a write mechanism of the storage system relative to the storage medium and determines a location on the storage medium to write the block of data based on the current position of the write mechanism. The storage system controller sends a notification to a host system identifying the location of the block of data on the storage medium as determined by the storage system controller. The writing mechanism writes the block of data to the determined location on the storage medium.

21 Claims, 6 Drawing Sheets

(56) References Cited

U.S. PATENT DOCUMENTS

2011/0122522 A1 5/2011 Itagaki et al.
2011/0157741 A1 6/2011 Shiratori et al.

FOREIGN PATENT DOCUMENTS

| | | | |
|---|---|---|---|
| JP | 2011-113605 A | 6/2011 | |
| JP | 2011-134413 A | 7/2011 | |
| WO | WO2012/176539 A1 | 12/2012 | |

OTHER PUBLICATIONS

International Search Report and Written Opinion dated Jan. 14, 2014 for International Application No. PCT/JP2013/006443, 7 pages.

* cited by examiner

DATA STORAGE MECHANISM USING STORAGE SYSTEM DETERMINED WRITE LOCATIONS

BACKGROUND

The present application relates generally to an improved data processing apparatus and method and more specifically to mechanisms for providing a data storage mechanism in which the storage system, or storage device itself, determines the write location for the data.

In various types of storage devices, including hard disk drives, magnetic tape storage devices, and the like, data is accessed, in an arbitrary manner, as blocks of data, i.e. a sequence of bytes or bits of data having a predetermined length or block size. When writing such a block of data to a storage medium, e.g., a hard disk, magnetic tape, or the like, of the storage device, a host system typically provides a block address for specifying the location on the storage device where the data is to be written, along with the block of data itself. The result of executing the write operation is sent back from the storage device to the host system. In many cases, the completion of the execution of the write operation is sent back to the host system at a time when the data is stored into a buffer of the storage device even though the actual writing into the storage medium has not yet been completed. The block locations where the data is to be written in the storage device are determined by the host system, i.e. on the host side, in advance of the write request being sent to the storage device. In some cases, readdressing operations may be performed inside a storage medium if, for example, there is a defective region in the storage medium, however the address space for readdressing is severely limited.

In storage devices where the amount of time necessary to move the read/write mechanisms, e.g., the read/write head, from a current block location to a next block location being access is very short, such as in the case of a hard disk drive, the performance degradation caused by waiting until the completion of movement of the read/write mechanism, e.g., the seek operation or locate operation, is not severe. This is because the difference between the minimum movement time (e.g., seek time) and the maximum movement time (e.g., seek time) is relatively small. Thus, the movement time for any particular access operation may be considered uniform across the storage device. If a buffer is used in the storage system, since time for waiting until the completion of movement is short, it is rare that the buffers become full, thus causing buffering of additional data for read/write access operations to be unavailable. Since this is rare due to the access speeds of such hard disk drives, modern technology has adopted the methodology of sending an address and the corresponding data at the same time when a write request is made to the storage system from a host system.

However, when a block access operation is performed on a storage device in which the movement time for the read/write mechanism, e.g., the seek or locate operation, to position itself relative to a location on the storage medium is longer than an acceptable amount of time for waiting for the block access operation to complete, it becomes necessary to take movement time of the read/write mechanism into consideration when addressing the storage medium. That is, when the difference between the minimum movement time (e.g., seek time) and the maximum movement time (e.g., seek time) is relatively large, then the movement time may affect the buffering ability for data being written to, or read from, the storage medium. This may be especially a problem with regard to magnetic tape media and storage devices, for example.

SUMMARY

In one illustrative embodiment, a method, in a storage system controller of a storage system, for writing data to a storage medium of the storage system is provided. The method comprises receiving, in the storage system controller, a write request to write at least one block of data to the storage medium of the storage system. The write request does not specify a location on the storage medium to which to write the at least one block of data. The method further comprises determining, by the storage system controller, a current position of a write mechanism of the storage system relative to the storage medium and determining, by the storage system controller, a location on the storage medium to write the at least one block of data based on the current position of the write mechanism. The method also comprises sending a notification, from the storage system controller to the host system, identifying the location of the at least one block of data on the storage medium as determined by the storage system controller. Furthermore, the method comprises writing, by the writing mechanism of the storage system, the at least one block of data to the determined location on the storage medium.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for providing a data storage mechanism in which the storage system, or storage device itself, determines the write location for the data based on the current position of the read/write mechanism and performance requirements submitted by the host system with a write request. That is, with the illustrative embodiments, the storage system, or storage device itself, determines where to write the data on the storage medium rather than the host system specifying the location of the data on the storage medium. To the contrary, the host system specifies the desired performance criteria, if any, for the write operation and, based on the current position of the read/write mechanism of the storage system or storage device, the storage system or storage device identifies a location on the storage medium where the data may be written while meeting the performance criteria specified by the host system. The storage system or storage device may then report back to the host system the location where the data was written in the confirmation message to the host system indicating completion of the write operation.

As mentioned above, for storage systems/devices where the movement time for the read/wire mechanism is relatively large relative to other storage systems/devices, the movement time must be considered when it comes to buffering data for write operations since the delay for movement of the read/write mechanism may lead to full buffers and ultimately errors when write requests are sent to the storage system/device. Such storage systems/devices may be of a magnetic tape type, but are not limited to such.

In addition, the size of the data block on the magnetic tape storage medium is far larger than that of a hard disk storage device. Thus, the amount of data stored in the data block for a magnetic tape storage medium is generally larger than a hard disk and the amount of time to move the read/write mechanism, e.g., the read/write head, is relatively larger and the time between the minimum movement time and the maximum movement time is relative larger than that of hard disk storage systems/devices. This all leads to a larger likelihood that write buffers may be filled with the potential for causing a reduction in performance of the storage system/device and the host system with regard to throughput of read/write access operations.

Furthermore, since a logical block size used by a host system, and a physical block size used by storage medium of the storage system/device, are different, in many cases steps are taken for rewriting data blocks already stored on the storage medium in response to a new write request being received. That is, when a write request is received in the storage system/device, a first operation is to have the logical blocks subsequent to a target logical block of the write request on the storage medium, i.e. the logical blocks having storage locations subsequent to the storage location specified by the host system for the target logical block, read and written into a storage system buffer in the storage system/device. In a second operation, the target logical block of the write request is rewritten on the storage system buffer such that the storage system buffer has both the target logical block and the subsequent logical blocks. In a third operation, the rewritten target logical block and the subsequent logical blocks are written back from the storage system buffer to the storage medium. It should be noted that if the writing of the third operation and the first read operation are performed on a physical block at a same location on the storage medium, a tape-rewinding operation may be necessary to accomplish these operations and, as a result, the time required for performing these operations may be relatively long.

It should also be considered that writing data arbitrarily at different locations of the storage medium may lead to increased latencies due to the required movement times (e.g., seek or locate times) for accessing all of the required data, such as all of the data for a specified file. For example, assume that one file is made up of multiple logical, or physical, blocks of data. When one of the logical (or physical) blocks of data are rewritten, if the location of the block of data that is to be rewritten (or written) is determined irrespective of the locations of other ones of the logical (or physical) blocks of data of the file, there is a possibility that, after rewriting, time taken for accessing the entire file will increase because of the read/write mechanism movement time (e.g., seek or locate time) for going from one logical, or physical, block of data to the next. Thus, it is important to locate blocks of data related to one another, such as corresponding to the same file, in close proximity to each other on the storage medium.

The illustrative embodiments make it possible to issue a write request from a host system without designating a write location where the data is to be stored on the storage medium. To the contrary, with the illustrative embodiments, the storage system/device determines the write location on the storage medium and reports that location back to the host system as a response to the original write request.

Moreover, the illustrative embodiments allow the host system to provide additional information in the write request to specify performance criteria for assisting the storage system/device in determining an appropriate location to write the data on the storage medium. This additional information may include, for example, information on the current physical location of a data block that is located in front of (logically before) the target block of data for which the write operation should be performed, and the current location of a block of data that is located behind (logically after) the target block of data. Depending on the arrangement of blocks of data on the storage medium, the illustrative embodiments make it possible to move other blocks of data and to provide additional write-request-response information to the host system based on this movement of blocks of data. This additional write-request-response information may include, for example, information on the old and new physical locations of the moved blocks of data.

With the mechanisms of the illustrative embodiments, it is possible to optimize the write location in accordance with the characteristics of each individual storage system/device. Moreover, the write location may be further optimized in accordance with the performance requirements specified by the host system. An algorithm for determining the write location may be configured as an adjustable algorithm with preset (default) parameters, such as write performance and read performance parameters, which may be overridden by host system specified performance parameters in the write requests sent by the host system.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
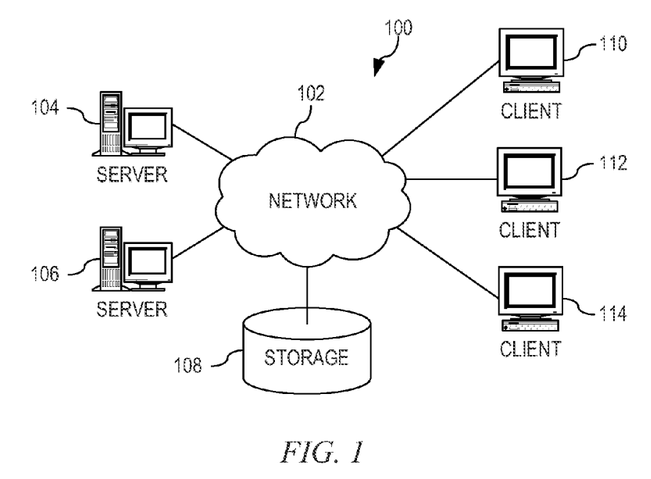
FIG. 1 is an example diagram of a distributed data processing system in which aspects of the illustrative embodiments may be implemented.
Figure 2:
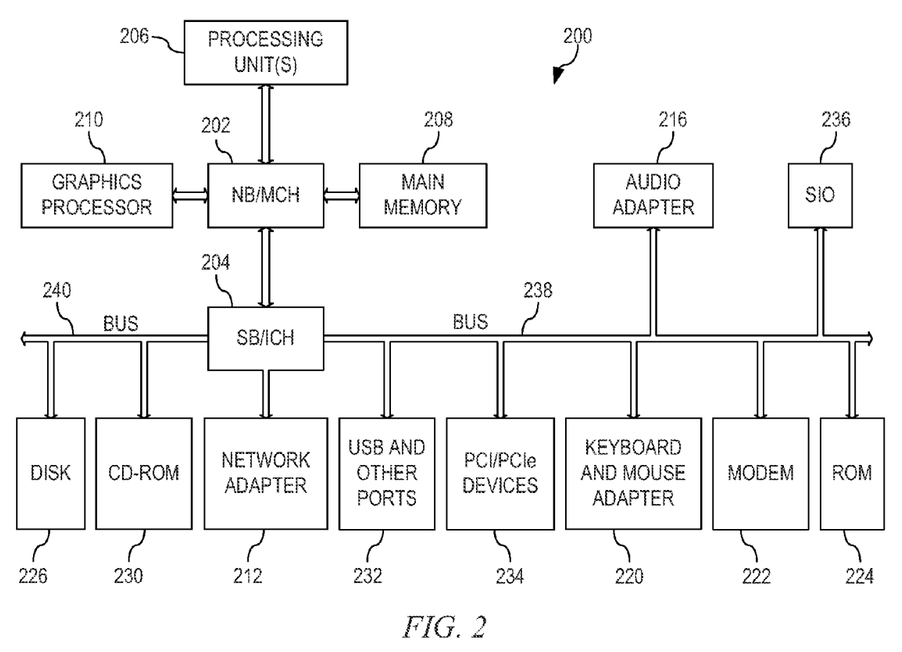
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (510) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments are directed to the handling of write requests from host systems directed to a storage system/device. As such, the host system may be a computing device, such as a server computing device, a client computing device, or the like. The storage system/device may be a local storage system/device, a remotely located storage system/device accessible by one or more data networks, or the like. In one illustrative embodiment, the host system is a server or client computing device that sends write requests to a locally attached storage system/device. In other illustrative embodiments, the host system is a server or client computing device that sends write requests to a remotely located storage system/device. Thus, with reference again to FIG. 1, the host system may be a server 104 or 106, a client computing device 110-114, or the like. The storage system/device may be the network attached storage system/device 108, or a storage system/device locally coupled to one of the servers 104, 106 or client computing devices 110-114 (not shown). The storage system may be comprised of a plurality of storage devices. Alternatively, the storage system/device may be a single storage device.

The storage system/device includes a storage system/device controller that comprises logic for controlling accesses to the storage media of the storage system/device. In accordance with the illustrative embodiments, this storage system device controller logic may be configured to implement the functionality and operations of the illustrative embodiments with regard to determining appropriate locations for writing data, determining movements of data on storage media, and reporting back location information for data written, or rewritten, to the storage media as responses to write requests from a host system.

The host system is further configured to implement the functionality and operations attributed to the host system in the description of the illustrative embodiments. Such functionality includes the generation and transmission of write requests to the storage system/device which do not specify a location for the data to be written but may include additional information for specifying required performance parameters to assist the storage system/device controller in selecting an appropriate location for the data on the storage media.

Figure 3:
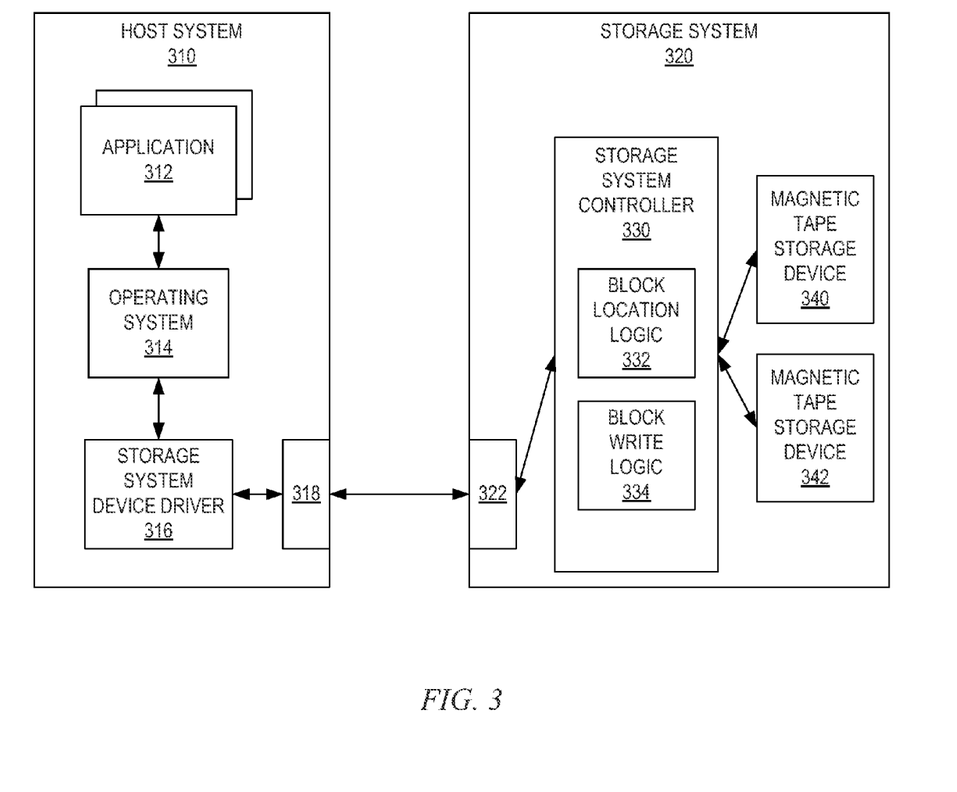
FIG. 3 is an example block diagram of the interaction of the host system and a storage system in accordance with one illustrative embodiment.

FIG. 3 is an example block diagram of the interaction of the host system and a storage system in accordance with one illustrative embodiment. For purposes of the present description, it will be assumed that the storage media utilized by the storage system in FIG. 3 is magnetic tape storage media because of its nature of having relatively long movement times (e.g., seek or locate times for locating a block of data) for the read/write mechanisms, e.g., the read/write magnetic head of the storage device. It will also be assumed that the data is stored in blocks having a pre-defined block size. It should be appreciated that the mechanisms and principles of the present invention are not limited to these specific types of storage systems/devices and media, or to block data storage systems. To the contrary, the illustrative embodiments may likewise be applied to other types of storage systems/devices, including hard disk drives, memory chip based storage devices, and the like. Moreover, the illustrative embodiments may be applied to storage systems/devices that store data in variable sizes rather than block storage systems/devices.

In addition, various formats may be used for location information that may be communicated between the storage system and the host system without departing from the spirit and scope of the illustrative embodiments. However, for purposes of the following description, the location information is assumed to be expressed in terms of an address-length pair format, such as [starting address, length]. The location information may further be a concatenation of address-length pairs of this type. For example, if all of the data blocks being referenced are successive without any dis-contiguous block regions (discontinuity), the locations of the blocks of data may be expressed by means of an address-length pair of the type [starting block address, number of blocks of data]. If there are any dis-contiguous regions, the locations of the blocks of data are expressed by means of a concatenation of address-length pairs such as [starting address location of starting block 1, number of blocks 1], [starting address location of block 2, number of blocks 2], . . . , [starting address location of block n, number of blocks n], where n is the number of regions of contiguous blocks of data within an address range of the storage medium.

Using this format, the movement of a data block may be expressed in the format of an address-length pair for the old location and an address-length pair for the new location of the data block. Alternatively, the movement of the data block can be expressed as a triplet of [old location starting block address, new location starting block address, number of blocks].

Referring again to FIG. 3, the host system 310 is configured to execute one or more applications 312, an operating system 314, and a storage system device driver 316. An application 312 may send a write request to the operating system 314 which processes the write request and directs it to the storage system device driver 316 for communication to the storage system 320 via the input/output adapter 318 of the host system 310. In accordance with the illustrative embodiments, logic is provided in the host system 310 for generating write requests that do not specify the address of the write location in the target system. This logic may be implemented in any of the elements 312-316. In one illustrative embodiment, the logic for generating a write request in accordance with the illustrative embodiments is implemented in a file system layer of the operating system 314.

As mentioned above, the write request sent to the storage system 320 may be different from the write requests transmitted by known host system-storage system mechanisms. The write request comprises the block(s) of data to be written and optionally additional information specifying performance parameters for informing the storage system controller of the storage system of desired performance requirements for accessing the data blocks. Such additional information may include, for example, a proximity from the beginning of a magnetic tape storage medium. If the data is stored near the beginning of the magnetic tape storage medium, performing a locating operation to the position, after loading the tape cartridge into a drive, is much faster than if the data is stored towards the tail end of the magnetic tape storage medium. This is desirable if the data is known to be accessed frequently.

Another example of additional information that may be included in the write request from the host system is the location of preceding data to the data to be written and the location of the subsequent data to be written in a file. If the data is stored near the preceding data and the subsequent data, the total time to read all of the data of the file is much faster than if the data is spread out across the storage medium.

As another example of additional information that may be included in the write request, a parameter identifying how quickly the write should be finished may be provided, e.g. the parameter may specify that the write is to be performed as quickly as possible, that it is satisfactory to spend relatively larger amount of time to relocate blocks to make a following read operation finish more quickly, or the like. Yet another example of this additional information is a parameter specifying how closely/sparsely data is to be stored on the storage medium. Another example of this additional information is a parameter specifying where data is stored from, e.g. from the beginning of the tape, from the end of the tape, or from the middle of the tape.

The additional information may further comprise hint information for assisting the storage system 320 in locating an appropriate location on the storage medium, e.g., magnetic tape storage devices 340 and 342, for storing the block(s) of data to be written. This hint information may comprise, for example, the current physical location of a block of data that is located in front of (logically before) the block of data for which the writing operation is to be performed, i.e. the target block, and the current physical location of the block of data that is located behind (logically after) the target block. Thus, a write request from the host system 310 may comprise not only the block(s) of data to be written to the storage system 320, but also hint information and performance information for assisting the storage system 320 in selecting a location on the storage media where the block(s) of data should be written.

The write request originates from an application 312, which may utilize an application address space and may utilize a logical or virtual address for specifying the address associated with the block of data to be written. The request is passed to the operating system 314 which may generate a write request, in accordance with the illustrative embodiments to target to storage system 320 and directs the write request to the storage system 320. As mentioned above, this write request may specify the block of data to be written without specifying the target address location on the storage media for the block of data. The write request may further specify performance requirements data and/or hint information as noted above.

The write request is passed to the storage system device driver 316 which transmits the read request via the input/output adapter 318 to the storage system 320. This transmission may be via a direct local connection or may be via one or more data networks of a wired and/or wireless nature.

The storage system 320 receives the write request from the host system 310 in the input/output adapter 322 of the storage system. The write request is provided to the storage system controller 330 which processes the write request to determine where to store the block of data in the write request on the magnetic tape storage device 340 and/or 342. The storage system controller 330 comprises block location logic 332 for determining where to store the block of data from the write request, whether movement of other blocks of data already recorded on the magnetic tape media of the device 340 and/or 342 is to be performed, how to perform the movement of blocks of data on the magnetic tape media, and provides commands to control the writing of the blocks of data, movement of blocks of data, and the like, to the block write logic 334 which then sends control commands to the physical read/write heads of the storage device 340 and/or 342 to perform the writing/moving of blocks of data.

In operation, in response to receiving a write request from the host system 310, the storage system controller 330 provides the information in the write request to the block location logic 332 which processes any hint information in the write request, as well as the information regarding the block(s) of data to be written, i.e. the target block(s) (hereafter it will be assumed that a single block is being written although the present invention is not limited to such). As mentioned above, the information regarding locations of blocks of data on the storage media, e.g., magnetic tape media of the magnetic tape storage devices 340, 342, may be specified as tuples, such as [starting address, number of blocks of data]. Thus, the hint information that may be provided in the write request may be physical location tuples for the block of data before the target block (preceding block of data) and the block of data after the target block (subsequent block of data), thereby specifying a continuous range of blocks of data that are to be written together on the storage media.

The block location logic 332 determines, based on a current position of the read/write head relative to the storage medium of the storage device 340, 342 to which the write is targeted, the direction of movement of the read/write head, the hint information provided in the write request, and the information regarding the block(s) of data to be written, determines an appropriate location on the storage medium for writing the block of data. This determination may further be based on, and may result in, the movement of other blocks of data already stored on the storage medium. In one illustrative embodiment, this determine is one in which the location on the storage medium where it is possible to complete the writing operation in a shortest amount of time is determined based on the current position of the read/write head and its direction of movement, further taking into consideration the number of blocks of data to be written and the hint information, if any.

Based on the determined location for the writing of the block(s) of data specified in the write request, the block(s) of data are stored in a buffer of the block write logic 334 and the storage system controller 330 transmits a notification of the determined location to the host system 310. The storage system controller 330 may also transmit a notification of the physical locations of any moved data blocks that are moved as a consequence of the performance of the write operation. The location information may be communicated to the host system as the tuples, or even the triplet, previously discussed above at the introduction of FIG. 3, e.g., starting block address and number of blocks. This information may be maintained in a block location table data structure 315 associated with the operating system 314 of the host system 310, for example, and may be used to perform read requests for targeting blocks of data on the storage media for read operations and/or for providing hint information in subsequent write requests. The operating system 314 and/or an associated file system, may determine when to provide the information stored in the block location table data structure 315, and what information to provide, when generating write requests.

For example, the operating system 314 knows which files are accessed frequently, how (e.g. the sequence) files are accessed, etc. through conventional mechanisms. Based on this information, and the location or correlation of the data to be written to the other data stored on the storage medium, the operating system 314 determines what additional information to include in the write request. For example, if data blocks in the middle of a file are to be updated, it is better to provide which block is the preceding block of the first block of the to-be-updated blocks and which block is the subsequent block of the last block of the to-be-update blocks to minimize the total access time of the file containing the updated blocks. However, even if the operating system 314 does not specify such additional information, the storage system stores the blocks on the storage medium. The difference between performing a write operation using the additional information provided in a write request and performing a write operation without additional information being provided is the location where the data blocks are stored on the storage medium. If the additional information is not provided in the write request, the location on the storage medium where the data blocks are stored may not be as efficient from a performance point of view.

The notifications of the physical location information may be returned to the host system 310 from the storage system controller 330 as a response to the write request indicating to the host system 310 that the write operation has been completed successfully. This can be done while the data is being written, by the block write logic 334, from the buffer of the block write logic 334 to the determined physical location on the physical media of an appropriate one of the magnetic tape storage device 340, 342. Alternatively, if the block(s) of data for the write request are not buffered, the status and location of the block(s) of data for the write request may be returned to the host system after the write operation is completed on the physical storage medium. In the case of buffered write operations, if an error occurs during the process of writing blocks of data to the physical medium, an error notification is issued back to the host system 310 for subsequent write commands.

Thus, with the mechanisms of the illustrative embodiments, the storage system controller 330 of the storage system 320 determines the location on the physical storage of the blocks of data on the storage media rather than having the host system 310 specify the locations. Hence, the illustrative embodiments make it possible to optimize the write location in accordance with the characteristics of each individual storage device, such as for example how long it takes to move the read/write head to a target location (minimum, average, and maximum movement time), how fast the storage system can write data, and the like.

With the use of the additional information included in the write request, hint information may be specified by the host system to assist the storage system in determining an optimum location for the block(s) of data being written to the storage medium. Moreover, the illustrative embodiments allow default performance parameters to be set which may be applied to write requests that do not themselves override these default performance parameters with other performance parameters specified in the additional information for the individual blocks of data of write requests. The default performance parameters, and the other performance parameters that may override the default performance parameters, may comprise various parameters including those that identify whether data is to be written from a beginning of a storage medium for faster read access, if writes should be completed as quickly as possible, if movement of data to increase future read accesses should be prioritized over quicker write access of the current write operation, or the like.

Figure 4A:
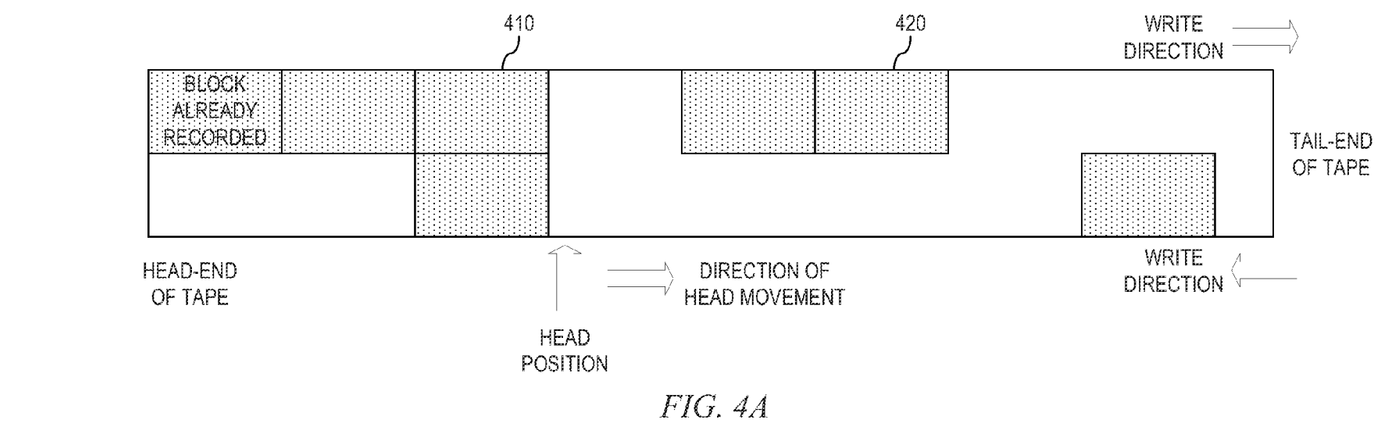
FIGS. 4A and 4B are example block diagrams illustrating an example write operation in accordance with one illustrative embodiment.
Figure 4B:
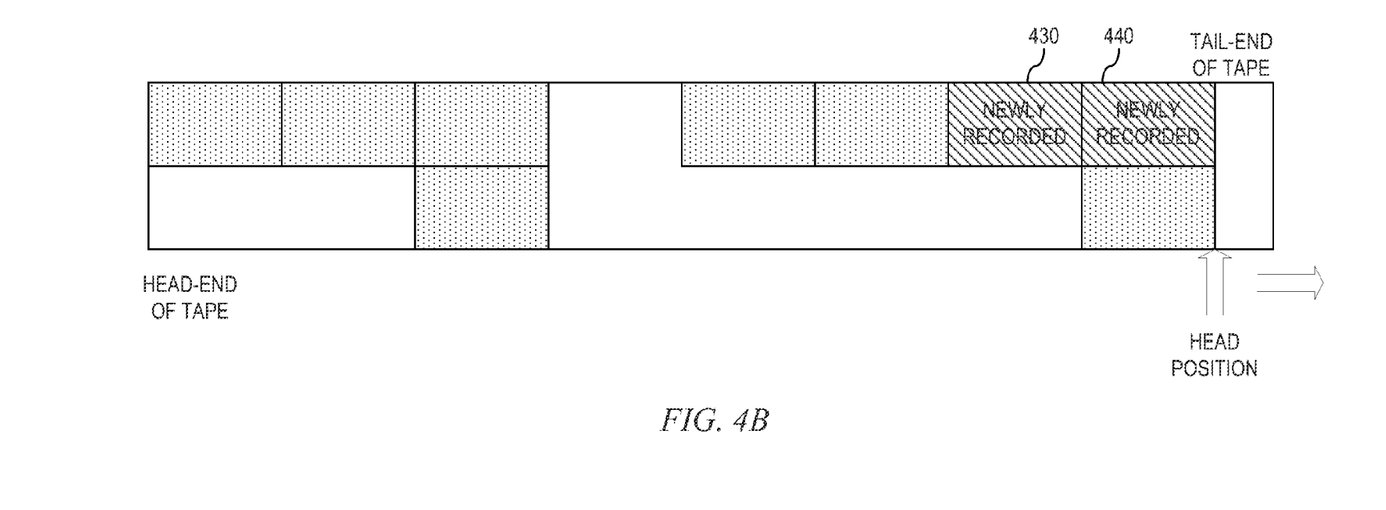

FIGS. 4A and 4B are example block diagrams illustrating an example write operation in accordance with one illustrative embodiment. The medium shown in FIGS. 4A-4B is a magnetic tape storage medium in which the head of the tape, or beginning of the tape (BOT), is on the left hand side of the figure while the tail of the tape, or end of the tape (EOT), is on the right hand side of the figure. It is assumed for the purposes of these examples that the magnetic tape storage medium writes in two directions and will become full with a single round-trip recording. Shaded blocks in FIGS. 4A and 4B represent blocks of data recorded on the magnetic tape storage medium.

FIG. 4A represents a state of the magnetic tape storage medium before the performance of a write operation. As shown, a plurality of blocks of data are already recorded on the magnetic tape storage medium. FIG. 4B illustrates a state of a magnetic tape storage medium after the performance of a write of two blocks of data due to the receipt of a write request.

That is, in the scenario illustrated in FIGS. 4A-4B, the host system 310 submits a write request for writing two blocks of data to the storage system comprising the magnetic tape storage medium. The storage system controller 330 of the storage system 320 determines a location where the write operation can be completed in the shortest period of time based on the current position of the read/write head and the direction of movement of the read/write head. In the depicted example, the read/write head is after data block 410 on the magnetic tape storage medium and is moving from left to right. Based on this positioning the first place along the movement path of the read/write head where the two blocks of data may be written is immediately after block 420.

The data of the two blocks of data is received into the buffer of the storage system controller 330 which returns a status notification and location information to the host system 310 indicating the location of where the two blocks of data are to be stored on the magnetic tape storage medium. For example, if block 410 has location information [2, 1] (meaning the starting block address is block 2 and the number of logical or physical blocks is 1), then the location of newly recorded block 430 is [6, 1] and newly recorded block 440 is [7, 1]. This may be reported back to the host system as a concatenation of the locations of the newly recorded blocks or, since the blocks are a contiguous region on the magnetic tape storage medium, may be reported as a single tuple of [6, 2] indicating that the starting block address is block 6 and the region comprises 2 blocks of data.

The blocks of data 430 and 440 are written to the magnetic tape storage medium as the read/write head moves from left to right over the magnetic tape storage medium resulting in the newly recorded blocks of data 430 and 440 at the storage system controller determined locations.

Figure 5A:
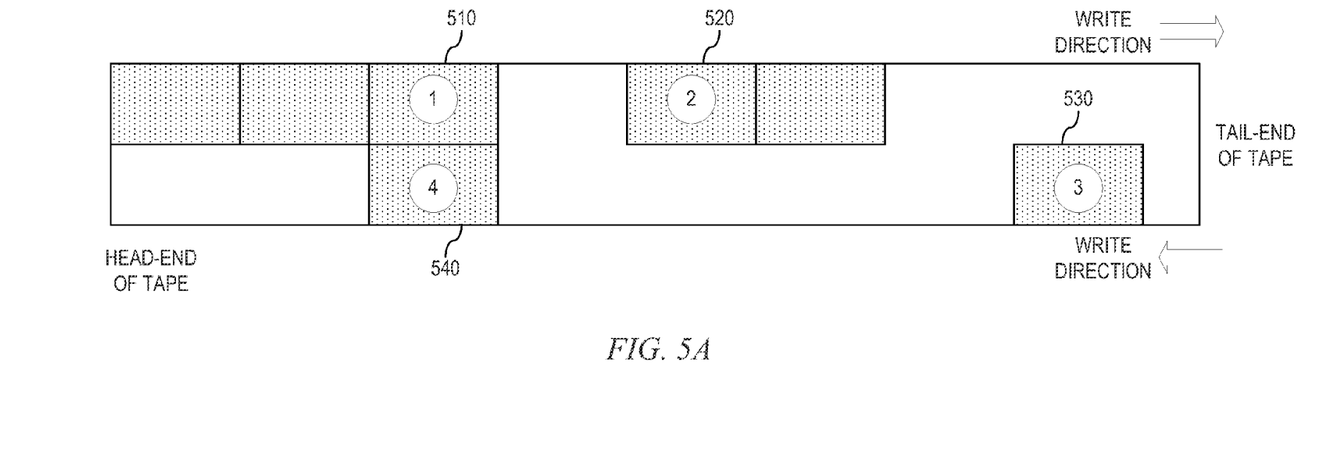
FIGS. 5A and 5B are example block diagrams illustrating another example of a write operation in accordance with one illustrative embodiment.
Figure 5B:
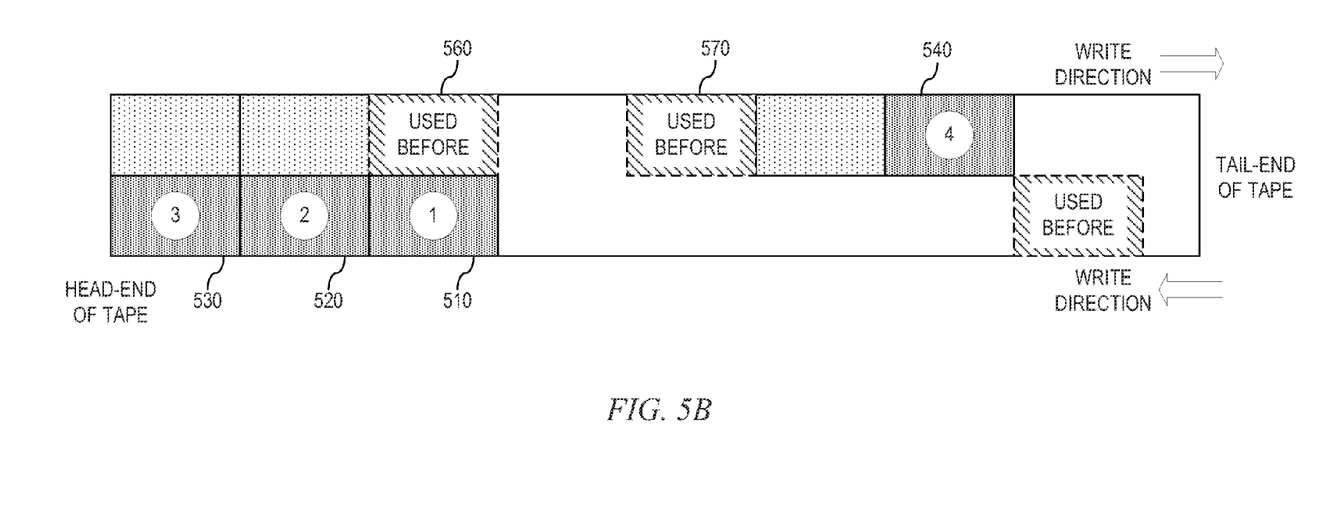

FIGS. 5A and 5B are example block diagrams illustrating another example of a write operation in accordance with one illustrative embodiment. Again, FIG. 5A represents the state of the magnetic tape storage medium prior to a write operation being performed while FIG. 5B represents the state of the magnetic tape storage medium after the write operation is performed.

For purposes of this example, assume that the block of data 520 in a file that is composed of blocks of data 510-530 should be rewritten on the magnetic tape medium as part of a write request sent from a host system. Further assume that it is desired that the blocks of data 510-530 of the file should be arranged at locations near the beginning of the magnetic tape storage medium since this is where access time will be relatively short after tape loading.

The storage system controller 330, in addition to the request for the writing of block 520, receives additional information from the host system identifying a location of block 510, which is located logically before block 520, and the location of block 530, which is logically located after block 520. The additional information may further specify the desire to have the blocks 510-530 of the file arranged in locations near the head of the magnetic tape storage medium and, if possible, in a contiguous region.

In response to receiving a write request having the data for block 520 and the additional information, the storage system controller 330 determines to move block 540 and arrange blocks 510-530 at new locations as shown in FIG. 5B. That is, the storage system controller 330 determines that block 510 should be written at the old location of block 540, block 520 should be written after block 510 (moving right to left), and block 530 should be written after block 520. The storage system controller 330 sends a notification to the host system 310 of the write location of block 520 and the new locations of blocks 510, 530, and 540 which are to be moved. The storage system 320 receives the new data for the block 520 to be written at the write location of block 520 determined by the storage system controller 330 in a buffer of the storage system controller 330, and reads the data of blocks 510, 530, and 540 from the magnetic tape storage medium into the buffer. Thereafter, the blocks 510-540 are written to the new locations on the magnetic tape storage medium. The old locations of the blocks 510-530 are no longer used to store blocks of data after the movement of these blocks 510-530 to new locations.

Figure 6A:
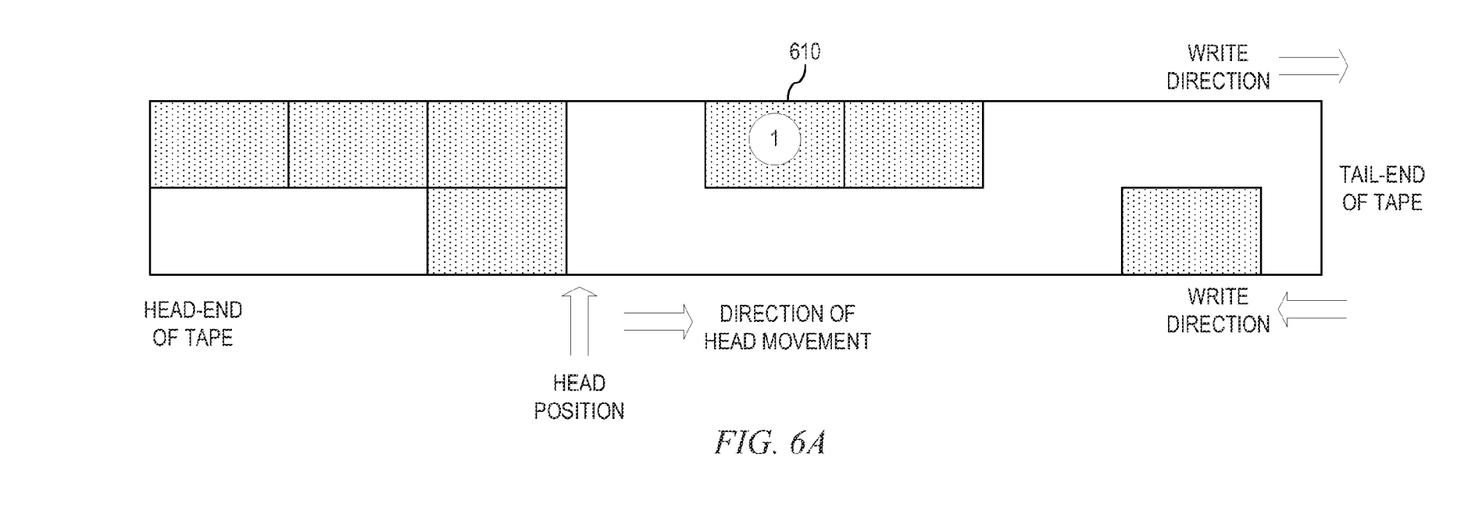
FIGS. 6A and 6B are example block diagrams illustrating yet another example of a write operation in accordance with one illustrative embodiment.
Figure 6B:
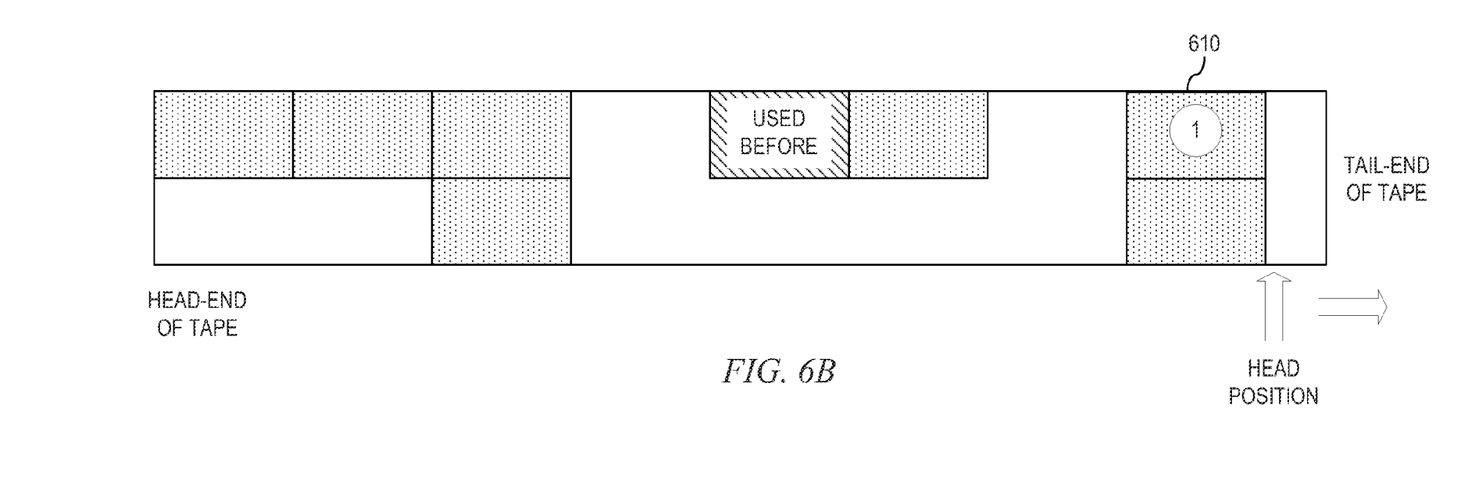

FIGS. 6A and 6B are example block diagrams illustrating yet another example of a write operation in accordance with one illustrative embodiment. A similar operation as described above with regard to FIGS. 4A-5B may be performed when the write operation is to a portion, e.g., a logical block, of an already recorded physical block of data instead of writing an entire physical block of data by the host system 310. That is, in some implementations, the host system 310 may operate on logical blocks of data that are smaller than a physical block of data utilized by the storage system 320. As a result, a single physical block may comprise a plurality of logical blocks.

In such a scenario, assume that there is a write request received in the storage system 320 for writing into one of the logical blocks in physical block 610. The storage system controller 330 determines the location where physical block 610 should be moved on the basis of the position of the read/write head, the direction of movement of the read/write head, the additional information in the write request, if any, and the like. The storage system 320 receives the data for the logical block an puts it into a first buffer of the storage system controller 330 and the storage system controller 330 sends a notification to the host system 310 indicating the status and the new location of the logical block and the other logical blocks of the physical block 610 that are to be moved. The block 610 at its current location is read into a second buffer and then the logical block stored in the first buffer is written to the second buffer. The data in the second buffer is then used to write the physical block to the new location on the magnetic tape storage medium as shown in FIG. 6B.

Thus, as discussed above, the illustrative embodiments provide mechanisms for the storage system itself to determine the optimum location to write data on the storage medium in accordance with the present conditions, e.g., the position of the read/write head, of the storage system/device, the amount of data to be written, and the additional information specifying other blocks of data associated with the block of data to be written and any desired performance parameters.

Figure 7:
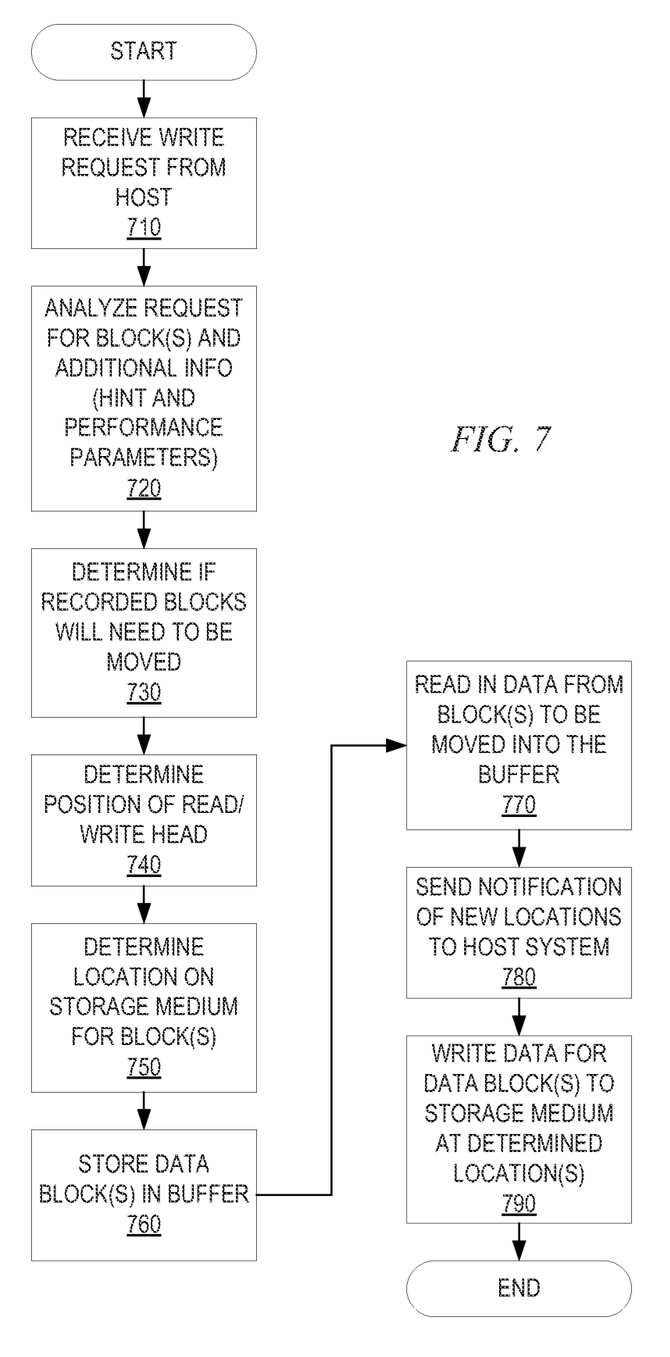
FIG. 7 is a flowchart outlining an example operation for handling a write request from a host system in a storage system controller in accordance with one illustrative embodiment.

FIG. 7 is a flowchart outlining an example operation for handling a write request from a host system in a storage system controller in accordance with one illustrative embodiment. As shown in FIG. 7, the operation starts with the receipt of a write request from a host system (step 710). The write request is analyzed to determine the block(s) to be written and any additional information specifying associated blocks and/or performance parameters required by the host system (step 720). A determination is made as to whether already recorded blocks of data will need to be moved to facilitate the write operation (step 730). A position and direction of movement of the read/write mechanism of the storage device to which the write operation is to be directed is determined (step 740). Based on the position of the read/write mechanism, the direction of movement, the number of blocks of data to be written or moved, and the additional information specifying performance parameters, the storage system controller determines locations for the blocks of data to be written and/or moved (step 750). The data for the blocks of data to be written are stored in a buffer (step 760). The data for blocks of data to be moved are read from the storage medium and stored in the buffer (step 770). A notification of the new locations of the blocks of data to be written and the blocks of data to be moved is returned to the host system (step 780). This information is stored by the host system in a block location table data structure for later use in performing read operations and/or for generating additional information for subsequent write operations. The data from the buffer is used to write the data for the blocks of data to be written and/or moved to the storage medium (step 790), and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a storage system controller of a storage system, for writing data to a storage medium of the storage system, comprising:

receiving, in the storage system controller, a write request to write at least one block of data to the storage medium of the storage system, wherein the write request does not specify a location on the storage medium to which to write the at least one block of data;

determining, by the storage system controller, a current position of a write mechanism of the storage system relative to the storage medium;

determining, by the storage system controller, a location on the storage medium to write the at least one block of data based on the current position of the write mechanism;

sending a notification, from the storage system controller to a host system from which the write request was received, identifying the location of the at least one block of data on the storage medium as determined by the storage system controller; and writing, by the writing mechanism of the storage system, the at least one block of data to the determined location on the storage medium, wherein:

the write request comprises at least one performance parameter specifying a desired performance characteristic for accessing the at least one block of data, the storage system controller determines a location on the storage medium to write the at least one block of data based on the performance parameter, and the at least one performance parameter comprises a parameter specifying a setting indicating how rapidly the write operation corresponding to the write request should be performed.

2. The method of claim 1, wherein the at least one performance parameter comprises a parameter specifying a proximity setting relative to a beginning of the storage medium where the at least one block of data is to be written.

3. The method of claim 1, wherein the at least one performance parameter comprises a parameter specifying how sparsely data is to be stored on the storage medium.

4. The method of claim 1, wherein the write request comprises additional information specifying a first current physical location, on the storage medium, of a preceding data block that is located logically before the at least one block of data and a second current physical location, on the storage medium, of a subsequent data block that is located logically after the at least one block of data.

5. The method of claim 4, wherein the storage system controller determines a location on the storage medium to write the at least one block of data based on the first current physical location and the second current physical location.

6. The method of claim 4, wherein writing the at least one block of data to the determined location on the storage medium further comprises moving at least one of the preceding data block or the subsequent data block to a new location on the storage medium to provide contiguous positioning of the preceding data block, the at least one block of data, and the subsequent data block.

7. The method of claim 4, wherein the first current physical location and second current physical location are provided in the additional information as tuples having the format [starting physical address, number of data blocks].

8. The method of claim 1, wherein the performance parameters of the write request are set by at least one of an operating system or a file system of a host system submitting the write request based on information identifying at least one of a frequency of access of the at least one block of data or a sequence of access of data blocks associated with the at least one block of data.

9. A method, in a storage system controller of a storage system, for writing data to a storage medium of the storage system, comprising:
receiving, in the storage system controller, a write request to write at least one block of data to the storage medium of the storage system, wherein the write request does not specify a location on the storage medium to which to write the at least one block of data;
determining, by the storage system controller, a current position of a write mechanism of the storage system relative to the storage medium;
determining, by the storage system controller, a location on the storage medium to write the at least one block of data based on the current position of the write mechanism;
sending a notification, from the storage system controller to a host system from which the write request was received, identifying the location of the at least one block of data on the storage medium as determined by the storage system controller; and
writing, by the writing mechanism of the storage system, the at least one block of data to the determined location on the storage medium, wherein the at least one block of data is buffered by the storage system controller before performing a write operation to write the at least one block of data to the storage medium, and wherein sending the notification is performed subsequent to the determination of the location on the storage medium to write the at least one block of data and prior to completion of the write operation.

10. The method of claim 1, wherein the storage medium is a magnetic tape storage medium.

11. A computer program product comprising a non-transitory computer readable medium having a computer readable program stored therein, wherein the computer readable program, when executed by a storage system controller of a storage system comprising a storage medium, causes the storage system controller to:
receive a write request to write at least one block of data to the storage medium of the storage system, wherein the write request does not specify a location on the storage medium to which to write the at least one block of data;
determine a current position of a write mechanism of the storage system relative to the storage medium;
determine a location on the storage medium to write the at least one block of data based on the current position of the write mechanism;
send a notification, from the storage system controller to a host system from which the write request was received, identifying the location of the at least one block of data on the storage medium as determined by the storage system controller; and
write the at least one block of data to the determined location on the storage medium, wherein:
the write request comprises at least one performance parameter specifying a desired performance characteristic for accessing the at least one block of data,
the storage system controller determines a location on the storage medium to write the at least one block of data based on the performance parameter, and
the at least one performance parameter comprises a parameter specifying a setting indicating how rapidly the write operation corresponding to the write request should be performed.

12. The computer program product of claim 11, wherein the at least one performance parameter comprises a parameter specifying a proximity setting relative to a beginning of the storage medium where the at least one block of data is to be written.

13. The computer program product of claim 11, wherein the at least one performance parameter comprises a parameter specifying how sparsely data is to be stored on the storage medium.

14. The computer program product of claim 11, wherein the write request comprises additional information specifying a first current physical location, on the storage medium, of a preceding data block that is located logically before the at least one block of data and a second current physical location, on the storage medium, of a subsequent data block that is located logically after the at least one block of data.

15. The computer program product of claim 14, wherein the storage system controller determines a location on the storage medium to write the at least one block of data based on the first current physical location and the second current physical location.

16. The computer program product of claim 14, wherein writing the at least one block of data to the determined location on the storage medium further comprises moving at least one of the preceding data block or the subsequent data block to a new location on the storage medium to provide contiguous positioning of the preceding data block, the at least one block of data, and the subsequent data block.

17. The computer program product of claim 14, wherein the first current physical location and second current physical location are provided in the additional information as tuples having the format [starting physical address, number of data blocks].

18. The computer program product of claim 11, wherein the performance parameters of the write request are set by at least one of an operating system or a file system of a host system submitting the write request based on information identifying at least one of a frequency of access of the at least one block of data or a sequence of access of data blocks associated with the at least one block of data.

19. A computer program product comprising a non-transitory computer readable medium having a computer readable program stored therein, wherein the computer readable program, when executed by a storage system controller of a storage system comprising a storage medium, causes the storage system controller to:
- receive a write request to write at least one block of data to the storage medium of the storage system, wherein the write request does not specify a location on the storage medium to which to write the at least one block of data;
- determine a current position of a write mechanism of the storage system relative to the storage medium;
- determine a location on the storage medium to write the at least one block of data based on the current position of the write mechanism;
- send a notification, from the storage system controller to a host system from which the write request was received, identifying the location of the at least one block of data on the storage medium as determined by the storage system controller; and
- write the at least one block of data to the determined location on the storage medium, wherein the at least one block of data is buffered by the storage system controller before performing a write operation to write the at least one block of data to the storage medium, and wherein sending the notification is performed subsequent to the determination of the location on the storage medium to write the at least one block of data and prior to completion of the write operation.

20. The computer program product of claim 11, wherein the storage medium is a magnetic tape storage medium.

21. An apparatus, comprising:
- a storage system controller; and
- a storage medium coupled to the storage system controller, wherein the storage system controller comprises logic configured to:
- receive a write request to write at least one block of data to the storage medium of the storage system, wherein the write request does not specify a location on the storage medium to which to write the at least one block of data;
- determine a current position of a write mechanism of the storage system relative to the storage medium;
- determine a location on the storage medium to write the at least one block of data based on the current position of the write mechanism;
- send a notification, from the storage system controller to a host system from which the write request was received, identifying the location of the at least one block of data on the storage medium as determined by the storage system controller; and
- write the at least one block of data to the determined location on the storage medium, wherein:
- the write request comprises at least one performance parameter specifying a desired performance characteristic for accessing the at least one block of data,
- the storage system controller determines a location on the storage medium to write the at least one block of data based on the performance parameter, and
- the at least one performance parameter comprises a parameter specifying a setting indicating how rapidly the write operation corresponding to the write request should be performed.

* * * * *